US008077166B2

(12) United States Patent
Yeon

(10) Patent No.: US 8,077,166 B2
(45) Date of Patent: Dec. 13, 2011

(54) DRIVING APPARATUS AND DRIVING METHOD FOR DISPLAY DEVICE

(75) Inventor: Yeun-Mo Yeon, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 877 days.

(21) Appl. No.: 11/767,609

(22) Filed: Jun. 25, 2007

(65) Prior Publication Data

US 2008/0088611 A1 Apr. 17, 2008

(30) Foreign Application Priority Data

Aug. 7, 2006 (KR) ........................ 10-2006-0074230

(51) Int. Cl.
*G06F 3/038* (2006.01)
*G06T 1/60* (2006.01)
*G09G 5/36* (2006.01)

(52) U.S. Cl. ......................... 345/204; 345/545; 345/530

(58) Field of Classification Search ........................ None
See application file for complete search history.

(56) References Cited

U.S. PATENT DOCUMENTS

| | | | | |
|---|---|---|---|---|
| 4,422,094 | A * | 12/1983 | Lewis et al. | 348/628 |
| 5,008,938 | A * | 4/1991 | Freeburg et al. | 380/265 |
| 5,307,409 | A * | 4/1994 | Driscoll | 380/2 |
| 5,406,518 | A * | 4/1995 | Sun et al. | 365/194 |
| 5,825,879 | A * | 10/1998 | Davis | 380/216 |
| 5,867,431 | A * | 2/1999 | Sato | 365/189.04 |
| 6,351,814 | B1 * | 2/2002 | Batinic et al. | 713/194 |
| 2001/0016081 | A1 * | 8/2001 | Murakami | 382/263 |
| 2005/0128175 | A1 * | 6/2005 | Hong | 345/100 |
| 2006/0005047 | A1 * | 1/2006 | Lekatsas et al. | 713/193 |
| 2006/0007083 | A1 * | 1/2006 | Pai et al. | 345/87 |
| 2006/0139284 | A1 * | 6/2006 | Hong et al. | 345/98 |
| 2007/0233982 | A1 * | 10/2007 | Chen et al. | 711/163 |
| 2007/0280357 | A1 * | 12/2007 | Sung | 375/240.25 |

* cited by examiner

*Primary Examiner* — Bipin Shalwala
*Assistant Examiner* — Daniel Bedell
(74) *Attorney, Agent, or Firm* — F. Chau & Associates, LLC

(57) ABSTRACT

A driver and a driving method of a display device that includes a signal controller that processes image data input from an external circuit and a memory that is connected to the signal controller, wherein the signal controller includes a data converter that converts the image data and outputs the converted image data to the memory, and the data converter includes a data output unit that converts and outputs the image data and a data input unit that restores the image data input from the memory. Accordingly, the number of data transitions between the signal controller and the memory can be minimized to reduce current consumption and to reduce EMI.

15 Claims, 6 Drawing Sheets

FIG. 6A

| | | | | |
|---|---|---|---|---|
| DT1 | 0 | 1 | 0 | 1 |
| DT2 | 0 | 1 | 0 | 1 |
| DT3 | 0 | 1 | 0 | 1 |
| DT4 | 0 | 1 | 0 | 1 |
| DT5 | 0 | 1 | 0 | 1 |
| DT6 | 0 | 1 | 0 | 1 |
| DT7 | 0 | 1 | 0 | 1 |
| DT8 | 0 | 1 | 0 | 1 |

FIG. 6B

| | | | | |
|---|---|---|---|---|
| DTO1, DTI1 | 0 | 1 | 0 | 1 |
| DTO2, DTI2 | 0 | 0 | 0 | 0 |
| DTO3, DTI3 | 0 | 0 | 0 | 0 |
| DTO4, DTI4 | 0 | 0 | 0 | 0 |
| DTO5, DTI5 | 0 | 0 | 0 | 0 |
| DTO6, DTI6 | 0 | 0 | 0 | 0 |
| DTO7, DTI7 | 0 | 0 | 0 | 0 |
| DTO8, DTI8 | 0 | 0 | 0 | 0 |

DRIVING APPARATUS AND DRIVING METHOD FOR DISPLAY DEVICE

CROSS-REFERENCE TO RELATED APPLICATION

This application claims priority to and the benefit of Korean Patent Application No. 10-2006-0074230 filed in the Korean Intellectual Property Office on Aug. 7, 2006, the entire contents of which are incorporated herein by reference.

BACKGROUND OF THE INVENTION (a) Technical Field

The present disclosure relates to a driving apparatus and a driving method for a display device.

(b) Discussion of Related Art

Recently, flat panel display devices such as organic light emitting diode (OLED) display devices, plasma display panel (PDP) devices, and liquid crystal display (LCD) devices have been actively developed as substitutes for large and heavy cathode ray tube (CRT) devices.

The PDP device is a device displaying characters or images by using plasma generated from a gas discharge, and the OLED device is a device displaying characters or images by using electroluminescence of specific organic materials or polymers. The LCD device displays a desired image by applying an electric field to a liquid crystal layer disposed between two display panels and controlling the strength of the electric field to adjust the transmittance of light passing through the liquid crystal layer so as to display an image.

Among the display devices explained above, the LCD device and the OLED device both include a pixel having a switching device, a display panel including display signal lines, a gate driver that is used for turning on/off the switching device of the pixel by sending out a gate signal to gate lines among the display signal lines, a gray voltage generator that is used for generating a plurality of gray voltages, a data driver that is used for selecting a voltage corresponding to image data among the gray voltages as a data voltage and applying the data voltage to data lines among the display signal lines, and a signal controller that is used for controlling other components.

The signal controller processes the image data to be adequate for operating conditions of the display panel, for example, by comparing data of current and previous frames to control brightness of the screen. In order to process the image data, a memory that stores data temporarily is required. When data transitions in transferring data between the signal controller and the memory occur frequently, however, power consumption increases, so that EMI also increases.

SUMMARY OF THE INVENTION

Exemplary embodiments of the present invention have been made in an effort to provide a device and method of driving a display device having the advantage of being capable of minimizing the number of data transitions.

An exemplary embodiment of the present invention provides a driving apparatus for a display device including a signal controller that processes image data input from an external circuit and a memory that is connected to the signal controller, wherein the signal controller includes a data converter that converts the image data and outputs the converted image data to the memory, and wherein the data converter includes a data output unit that converts and outputs the image data and a data input unit that restores the image data input from the memory.

In the exemplary embodiment, the data output unit may include a plurality of logic circuits having the most significant bit and one of the remaining bits of the image data as inputs.

In addition, the data input unit may include a plurality of logic circuits having the most significant bit and one of the remaining bits of the image data received from the memory as inputs.

In addition, the most significant bit may not pass through the logic circuits, and the logic circuits may be exclusive OR gates.

An exemplary embodiment of the present invention provides a driving method for a display device including a signal controller that processes image data transferred from an external circuit and a memory that is connected to the signal controller, the method including the steps of converting all bits of the image data except for the most significant bit and transferring the converted image data to the memory, and restoring all bits of the image data received from the memory except for the most significant bit.

In the exemplary embodiment, the signal controller may include a data output unit that converts all the bits of the image data except for the most significant bit and outputs the converted image data to the memory, and a data input unit that restores all the bits of the image data input from the memory except for the most significant bit.

In addition, each of the data output and input units may include a plurality of exclusive OR gates.

Furthermore, each of the logic circuits may have the most significant hit and one of the remaining bits of the image data as inputs.

BRIEF DESCRIPTION OF THE DRAWINGS

Exemplary embodiments of the present invention will be understood in more detail from the following descriptions taken in conjunction with the attached drawings.

FIGS. 6A and 6B are tables illustrating an example of data conversion performed in the data converter according to an exemplary embodiment of the present invention.

DETAILED DESCRIPTION OF THE EXEMPLARY EMBODIMENTS

The present invention will be described more fully hereinafter with reference to the accompanying drawings, in which exemplary embodiments of the invention are shown.

A display device according to an exemplary embodiment of the present invention will be explained in detail, with reference to FIGS. 1 and 2, and a liquid crystal display is described as an example of a display device.

Figure 1:
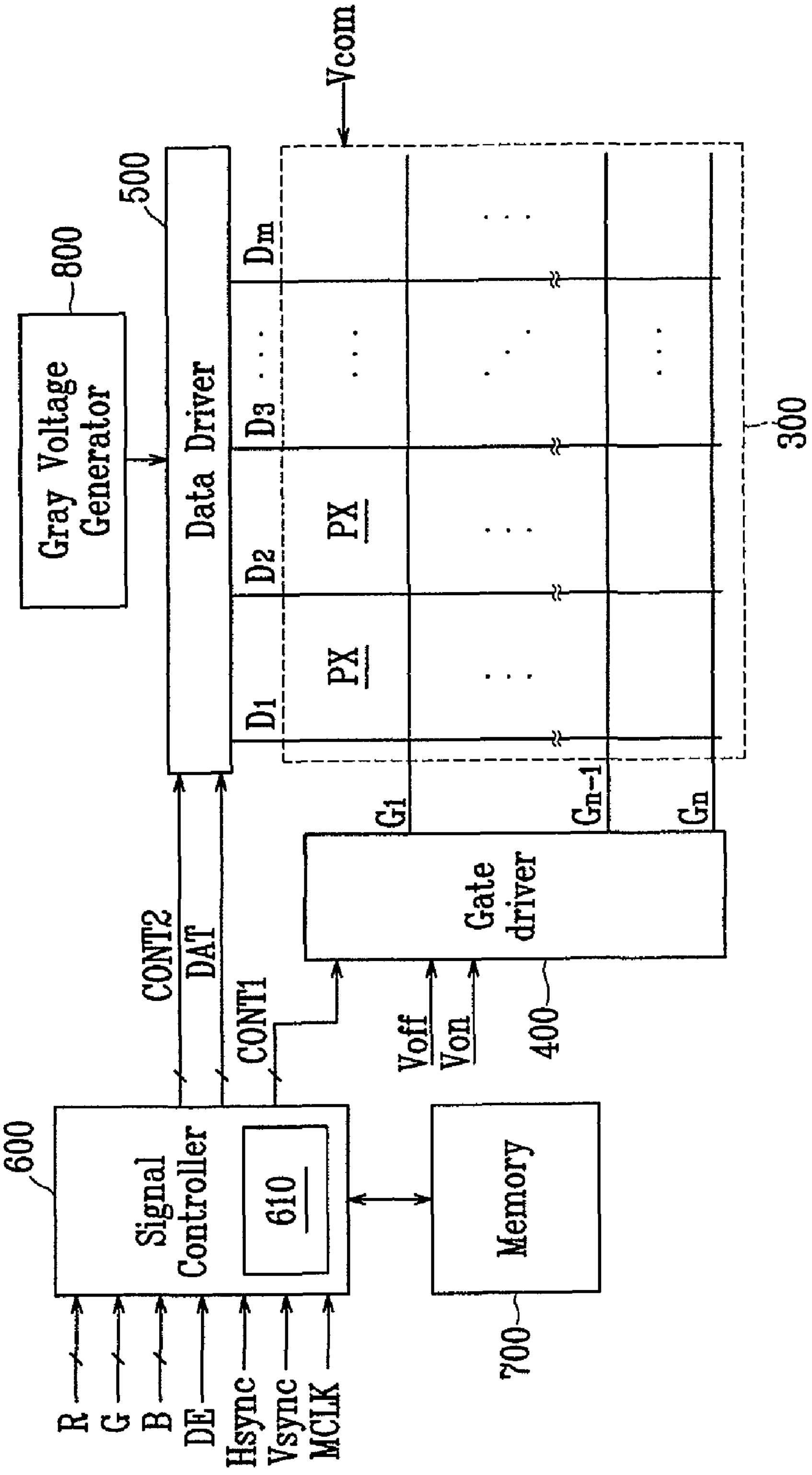
FIG. 1 is a block diagram of a liquid crystal display according to an exemplary embodiment of the present invention.
Figure 2:
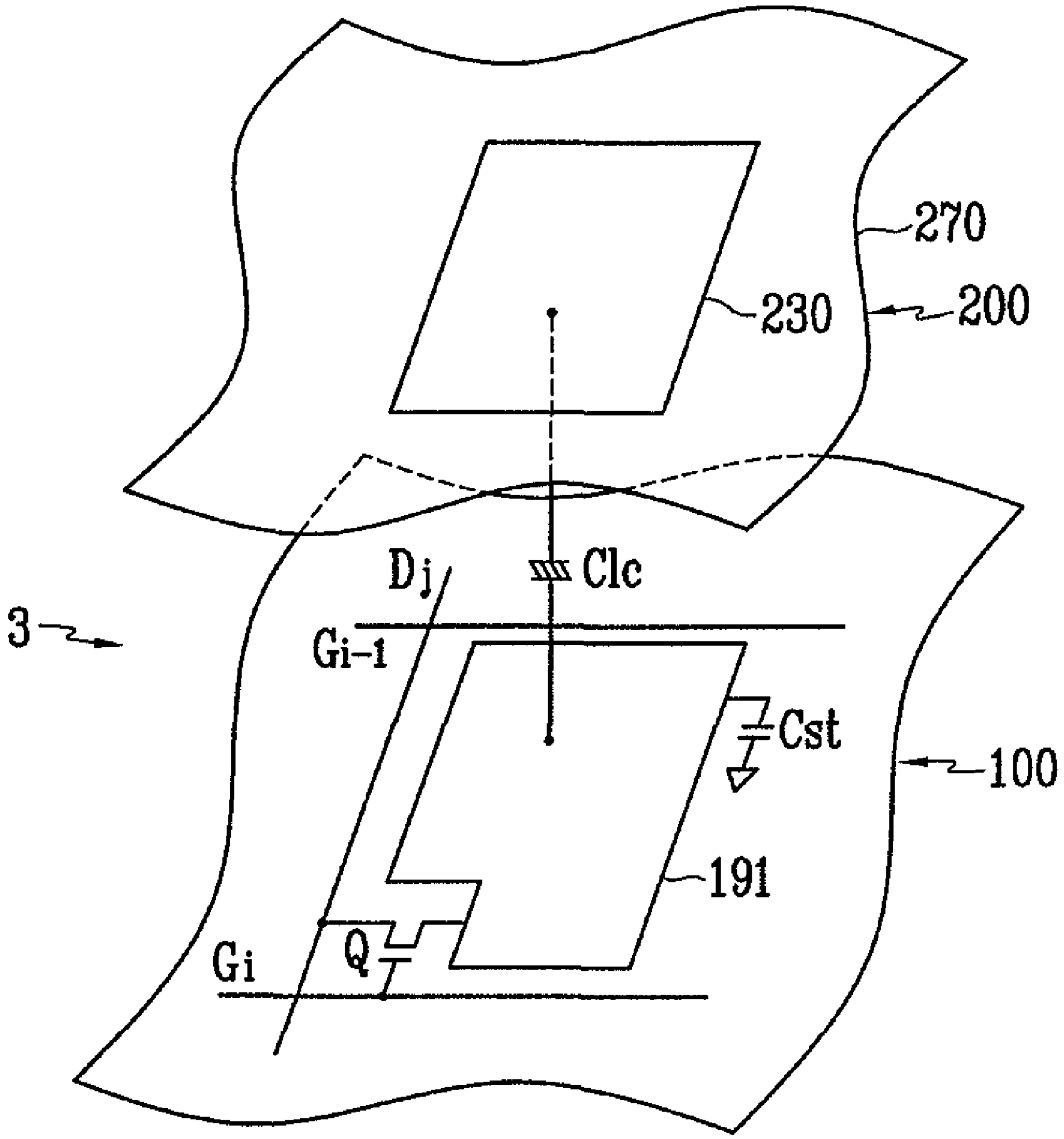
FIG. 2 is an equivalent circuit diagram for a pixel of a liquid crystal display according to an exemplary embodiment of the present invention.

FIG. 1 is a block diagram of a liquid crystal display according to an exemplary embodiment of the present invention, and FIG. 2 is an equivalent circuit diagram for a pixel of a liquid crystal display according to an exemplary embodiment of the present invention.

As shown in FIG. 1, the liquid crystal display according to an exemplary embodiment of the present invention includes a liquid crystal panel assembly 300, gate and data drivers 400 and 500 that are connected to the liquid crystal panel assembly 300, a gray voltage generator 800 that is connected to the data driver 500, a signal controller 600 that controls the other components, and a memory 700 that is connected to the signal controller 600. The signal controller 600 includes a data converter 610.

The liquid crystal panel assembly 300 includes a plurality of signal lines $G_1$ to $G_n$ and $D_1$ to $D_m$ and a plurality of pixels PXs that are connected to the signal lines and arranged in the approximate form of a matrix, in terms of an equivalent circuit. The liquid crystal panel assembly 300 includes lower and upper display panels 100 and 200 facing each other and a liquid crystal layer 3 disposed therebetween with reference to the structure shown in FIG. 2.

The signal lines $G_1$ to $G_n$ and $D_1$ to $D_m$ include a plurality of gate lines $G_1$ to $G_n$ delivering gate signals (also referred to as scan signals) and a plurality of data lines $D_1$ to $D_m$ delivering data signals. The gate lines $G_1$ to $G_n$ extend in an approximate row direction and are generally parallel to each other, and the data lines $D_1$ to $D_m$ extend in a column direction and are also generally parallel to each other.

Each pixel for example, a pixel PX that is connected to an i-th (i=1, 2, . . . , n) gate line $G_i$ and a j-th (j=1, 2, . . . , m) data line $D_j$, includes a switching element Q that is connected to signal lines ($G_i$ $D_j$), a liquid crystal capacitor Clc that is connected to the switching element Q, and a storage capacitor Cst. The storage capacitor Cst may be omitted as desired.

The switching element Q is a device having three terminals included in the lower display panel 100, such as a thin film transistor. In the switching element Q, a control terminal is connected to a gate line $G_i$, an input terminal is connected to a data line $D_j$, and an output terminal is connected to the liquid crystal capacitor Clc and the storage capacitor Cst.

The liquid crystal capacitor Clc has a pixel electrode 191 of the lower display panel 100 and a common electrode 270 of the upper display panel 200 as its two terminals, and the liquid crystal layer 3 disposed between the two electrodes 191 and 270 functions as a dielectric material. The pixel electrode 191 is connected to the switching element Q. The common electrode 270 is formed on a front side of the upper display panel 200, and a common voltage Vcom is applied to the common electrode 270. The common electrode 270 may be included in the lower display panel 100 differently from what is illustrated in FIG. 2, and in this case, at least one of the two electrodes 191 and 270 may be formed in a linear or bar shape.

The storage capacitor Cst, which assists the liquid crystal capacitor Clc, has a separate signal line (not shown) that overlaps the pixel electrode 191 provided on the lower panel 100 with an insulator interposed therebetween. A predetermined voltage, such as the common voltage Vcom, is applied to the separate signal line. The storage capacitor Cst, however, may be formed by the pixel electrode 191 and the overlying previous gate line arranged to overlap each other through the insulator.

On the other hand, in order to implement displaying colors, each of the pixels PXs may uniquely display one of the primary colors (called spatial division), or each of the pixels may alternately display one of the primary colors at a time (temporal division). A desired color can be recognized by a spatial and temporal combination of the primary colors. An example of the primary colors is the three primary colors including red, green, and blue. FIG. 2 is an example of the spatial division. As shown in FIG. 2, each of the pixels PX includes a color filter 230 representing one of the primary colors that is disposed in a region of the upper display panel 200 corresponding to the pixel electrode 191. Unlike what is shown in FIG. 2, the color filter 230 may be formed above or below the pixel electrode 191 of the lower display panel 100.

At least one polarizer (not shown) for polarizing light is attached to an outer surface of the liquid crystal panel assembly 300.

Referring to FIG. 1, the gray voltage generator 800 generates two gray voltage sets (or reference gray voltage sets) related to the light transmittance of the pixels PXs. Between the two gray voltage sets, one gray voltage set has a positive value with respect to the common voltage Vcom, and the other gray voltage set has a negative value with respect to the common voltage Vcom.

The gate driver 400 is connected to the gate lines $G_1$ to $G_n$ of the liquid crystal panel assembly 300. The gate driver 400 applies gate signals that are combinations of a gate-on voltage Von and a gate-off voltage Voff to the gate lines $G_1$ to $G_n$.

The data driver 500 is connected to the data lines $D_1$ to $D_m$ of the liquid crystal panel assembly 300. The data driver 500 selects one of the gray voltages generated by the gray voltage generator 800 and applies the selected gray voltage to the data lines $D_1$ to $D_m$ as a data signal. When the gray voltage generator 800 supplies the reference gray voltages of a predetermined number rather than the voltages for all gray levels, however, the data driver 500 divides the reference gray voltages so as to generate the gray voltages for all gray levels and selects the data voltage from among them.

The signal controller 600 controls the gate driver 400, the data driver 500, and the like.

Each of the units 400, 500, 600, and 800 may be directly mounted on the liquid crystal panel assembly 300 in the form of at least one integrated circuit chip. Alternatively, each of the units 400, 500, 600, and 800 may be mounted on a flexible printed circuit film (not shown) to be attached to the liquid crystal panel assembly 300 in the form of a tape earner package (TCP) or mounted on a separate printed circuit board (not shown). Alternatively, the units 400, 500, 600, and 800 may be integrated into the liquid crystal panel assembly 300 together with the signal lines $G_1$ to $G_n$ and $D_1$ to $D_m$, the thin film transistor switching element Q, and the like. In addition, the units 400, 500, 600, and 800 may be integrated into a single chip. And in this case, at least one of the units 400 500, 600, and 800 or at least one circuit element forming the units may be positioned outside the single chip.

The operations of the liquid crystal display device will now be explained in detail.

The signal controller 600 receives input image signals R, G, and B and input control signals for controlling display of the input image signals R, G, and B from an external graphic controller (not shown). A vertical synchronization signal Vsync, a horizontal synchronization signal Hsync, a main clock signal MCLK, and a data enable signal DE are examples of the input control signals.

The signal controller 600 processes the input image signals R, G, and B according to an operating condition of the liquid crystal panel assembly 300 based on the input image signals R, G, and B and the input control signals to generate a gate control signal CONT1, a data control signal CONT2, and the like. Then, the signal controller 600 outputs the generated data control signal CONT1 to the gate driver 400 and the generated data control signal CONT2 and the processed image signal DAT to the data driver 500.

The gate control signal CONT1 includes a scanning start signal that instructs to start scanning and at least one clock signal for controlling an output time of the gate-on voltage Von. The gate control signal CONT1 may further include an output enable signal for limiting a duration time of the gate-on voltage Von.

The data control signal CONT2 includes a horizontal synchronization start signal that is used for indicating initiation of data transmission for a row of pixels PXs, a load signal that is used for requesting to apply data signals to the data lines $D_1$ to $D_m$, and a data clock signal. The data control signal CONT2 may further include an inversion signal that inverts a voltage polarity of the data signal with respect to the common voltage Vcom, hereinafter, the voltage polarity of the data signal with respect to the common voltage is abbreviated to a polarity of the data signal.

The data driver 500 receives digital image signals DAT for a row of pixels PX according to the data control signal CONT2 transmitted from the signal controller 600 and selects a gray voltage corresponding to each digital image signal DAT to convert the digital image signals DAT into analog data signals. Thereafter, the data driver 500 applies the converted analog data signals to corresponding data lines $D_1$ to $D_m$.

The gate driver 400 applies a gate-on voltage Von to the gate lines $G_1$ to $G_n$ according to the gate control signal CONT1 transmitted from the signal controller 600 to turn-on switching devices Q connected to the gate lines $G_1$ to $G_n$. Then, the data signals applied to the data lines $D_1$ to $D_m$ are applied to corresponding pixels PX through the switching devices Q as they are turned on.

A difference between a voltage of the data signals applied to the pixels PX and the common voltage Vcom becomes a charge voltage of the liquid crystal capacitor Clc, that is, a pixel voltage. Alignment of the liquid crystal molecules varies according to the magnitude of the pixel voltage to change the polarization of light passing through the liquid crystal layer 3. The change in polarization causes a change in the transmittance of light by the polarizers attached to the display panel assembly 300.

In units of one horizontal period, which may be written as 1H and is the same as one period of the horizontal synchronization signal Hsync and the data enable signal DE, the aforementioned operations are repetitively performed to sequentially apply the gate-on voltages Von to all the gate lines $G_1$ to $G_n$, so that the data signals are applied to all the pixels PX. As a result one frame of an image is displayed.

When one frame ends, the next frame starts, and a state of the inversion signal applied to the data driver 500 is controlled, so that the polarity of data signals applied to each of the pixels is opposite to the polarity in the previous frame (frame inversion). At this time, even in one frame, according to the characteristics of the reverse signals, the polarity of the data signal flowing through the one data line may be inverted (row inversion and dot inversion). In addition, the polarities of the data signals applied to the one pixel row may be different form each other (column inversion and dot inversion).

Now, the data converter 610 of the signal controller 600 according to an exemplary embodiment of the present invention will be described in detail with reference to FIGS. 3 to 6B.

Figure 3:
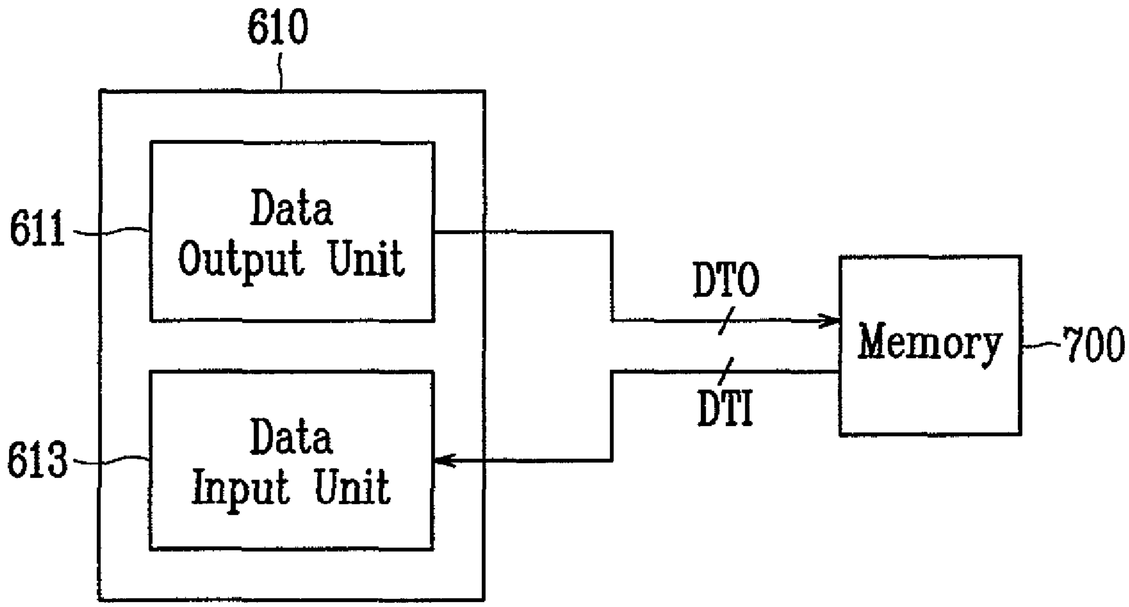
FIG. 3 is a block diagram of the data converter in FIG. 1.
Figure 4:
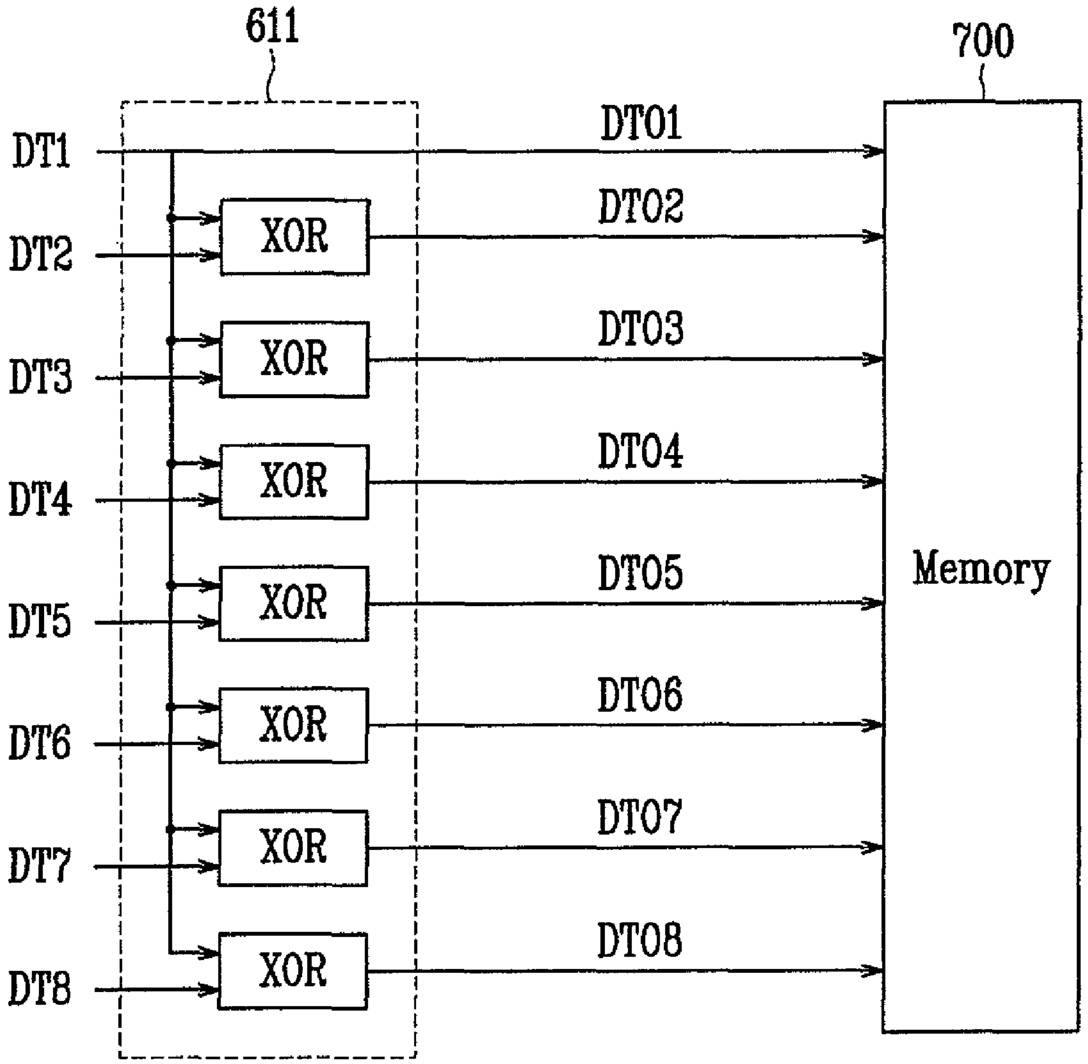
FIG. 4 is a circuit diagram of a data output unit included in the data converter in FIG. 3.
Figure 5:
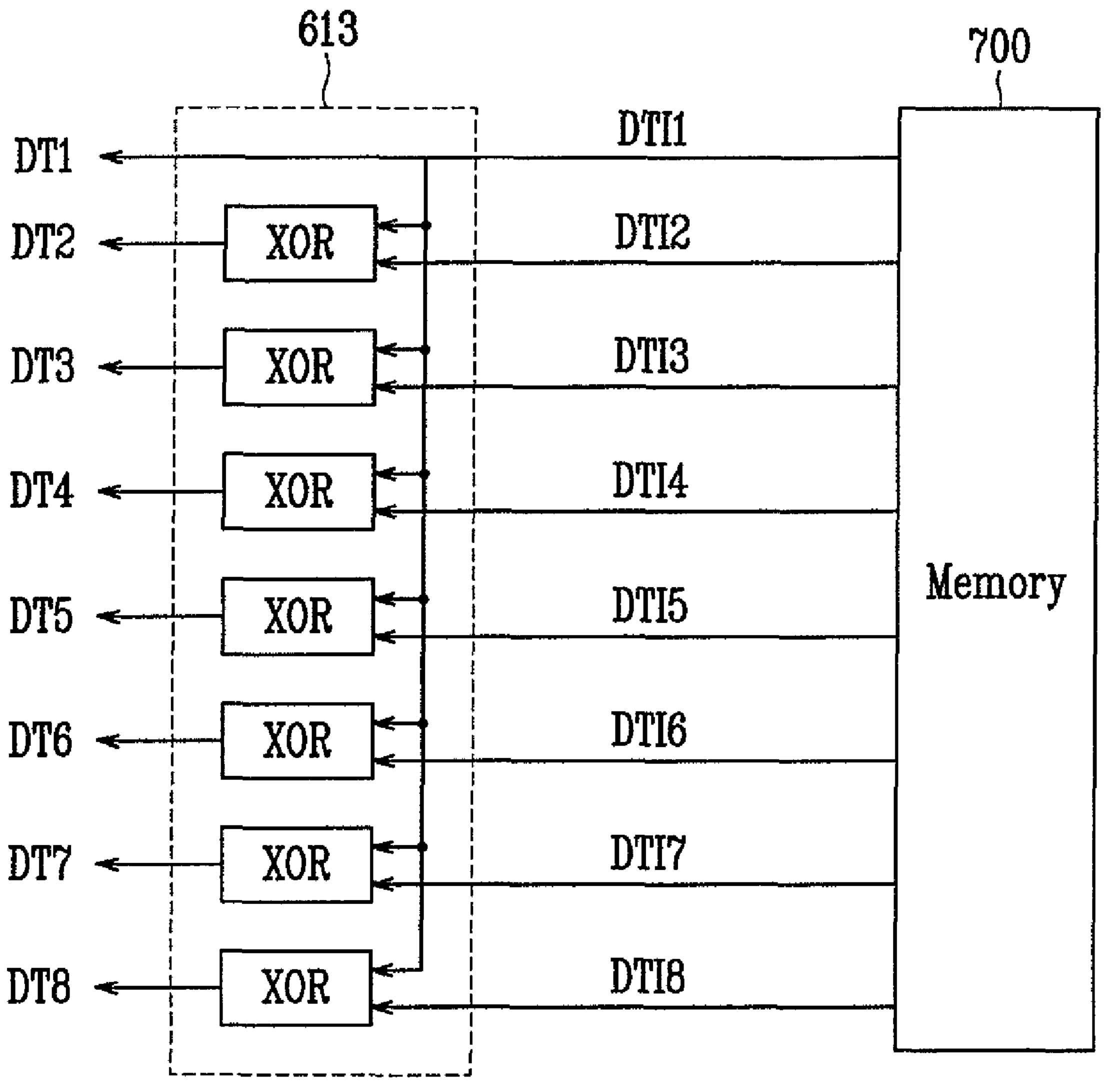
FIG. 5 is a circuit diagram of a data input unit included in the data converter in FIG. 3.

FIG. 3 is a block diagram of the data converter 610 shown in FIG. 1, FIG. 4 is a circuit diagram of a data output unit included in the data converter in FIG. 3, FIG. 5 is a circuit diagram of a data input unit included in the data converter in FIG. 3, and FIGS. 6A and 6B are tables illustrating an example of data conversion performed in the data converter according to an exemplary embodiment of the present invention.

Referring to FIGS. 3 to 6B, the data converter 610 according to the exemplary embodiment of the present invention includes a data output unit 611 and a data input unit 613.

As shown in FIGS. 4 and 5, the data output unit 611 and the data input unit 613 respectively include a plurality of XOR gates that are arranged linearly.

The data output unit 611 and the data input unit 613 respectively transfer data to/from the memory 700 in a parallel fashion. In FIGS. 4 and 5, an example of 8 bit data transfer is illustrated.

As shown in the table in FIG. 6A, data signals DT1 to DT8 (hereinafter, referred to as original data) of a same column before input to the data converter 610 are transferred together in parallel and thereafter data signals of the next column are transferred. These data signals DT1-DT8 are shown as inputs and outputs in FIGS. 4 and 5, respectively. In other words, as shown in the table of FIG. 6A, data signals of the first column that are all '0's are transferred. Next, data signals of the second column that are all '1's are transferred, and next, data signals of the third column that are all '0's are transferred. In this case, when a voltage required for recognizing a logic value T in the memory 700 is 3V, voltages applied to connection wires change from a ground voltage to 3V continuously and thereby increase the EMI.

As is well known, an exclusive OR (XOR) circuit outputs '1' when only one of the two inputs is '1', and outputs '0' when the two inputs have the same value, that is, when all inputs are '0's or '1's.

As shown in FIG. 4, the most significant bit (MSB) DT1 among the original data signals DT1 to DT8 is directly transferred to the memory 700 as output data signal DTO1 and is also input to the XOR gates, simultaneously.

The XOR gates receive the MSB DT1 and one of the remaining bits DT2 to DT8 as inputs and compare the two inputs to generate output data signals DTO2 to DTO8.

Since the original data signals DT1 to DT8 of the first column are all '0's, the two inputs of the XOR gates are the same, so that all the output data signals DTO1 to DTO8 become '0's, as shown in FIG. 6B.

As described above, since the original data signals DT1 to DT8 of the second column are all '1's, the two inputs of the XOR gates are the same, so that all the output data signals DTO2 to DTO8 except for the MSB data signal DTO1 become '0's.

When data signals are transferred from the memory 700 to the signal controller 600, the original data signals DT1 to DT8 should be restored. When all input data signals DTI1 to DTI8 from the memory 700 are '0's, the two inputs are '0's, so that all the original data signals DT1 to DT8 become '0's, which are the same as values indicated in the first column in the table of FIG. 6A.

Likewise, for input data signals DTI1 to DTI8 of the second column in FIG. 6B, the MSB DTI1 is '1', and the remaining hits DTI2 to DTI8 are '0's, and accordingly the two inputs of the XOR gates are different, so that all the XOR gate outputs become '1's, which are the same as the original data signals DT1 to DT8.

As described above, when data signals are transferred from the signal controller 600 to the memory 700, the number of data transitions can be minimized to decrease the EMI by inputting the MSB DT1 and the remaining bits DT2 to DT8 among input data signals to XOR gates as two inputs. In addition, when data signals are transferred from the memory 700 to the signal controller 600, the data signals can be restored by passing through XOR gates.

While the amounts of EMI generation are 28.17 dB and 29.68 dB in the first and second harmonics, respectively, according to a conventional method, the amounts of EMI generation decrease to 20 dB and 26 dB in the first and second harmonics, respectively, according to an exemplary embodiment of the present invention, based on an experimental result.

By using the above-described method, the number of transitions of data signals transferred between the signal controller 600 and the memory 700 can be minimized, and accordingly power consumption decreases to thereby reduce the EMI.

While exemplary embodiments of the present invention have been described in detail, the scope of the present invention is not limited thereto, and various modifications and equivalent arrangements using the basic concepts defined in the following claims that may be made by a person of an ordinary skill in the art shall be within the scope of the present invention.

What is claimed is:

1. A driving apparatus for a display device, the driving apparatus comprising:

a signal controller that processes image data from an external circuit; and a memory that is connected to the signal controller, wherein the signal controller comprises a data converter that converts the image data and outputs a converted image data corresponding to the image data to the memory, wherein the data converter comprises a data output unit that converts the image data and outputs the converted image data and a data input unit that receives the converted image data input from the memory and restores the image data corresponding to the converted image data from the received converted image data, wherein the data output unit outputs a most significant bit MSB of the image data to the memory and comprises a plurality of first logic circuits, and each of the first logic circuits has the MSB and one of the remaining bits of the image data as inputs to generate an operated-on bit for output to the memory, wherein the data input unit comprises a plurality of second logic circuits, and each of the second logic circuits has the MSB output from the memory and the operated-on bit output from the memory as inputs, and wherein the MSB of the image data and the operated-on bits are both input to the memory and output from the memory.

2. The driving apparatus of claim 1, wherein the MSB does not pass through the plurality of first and second logic circuits.

3. The driving apparatus of claim 2, wherein the plurality of first and second logic circuits comprise exclusive OR gates.

4. The driving apparatus of claim 1, wherein the operated-on bits and the MSB are received simultaneously from the memory.

5. The driving apparatus of claim 1, wherein the operated-on bit and the MSB are received from a same discrete memory as the remaining bits.

6. A driving method for a display device including a signal controller that processes image data transferred from an external circuit and a memory that is connected to the signal controller, the method comprising steps of:

converting, by first logic circuits of a data output unit of the signal controller, all bits of the image data, except for a most significant bit MSB, into converted image data, wherein the first logic circuits use the MSB when converting each bit of the image data;

transferring, by the data output unit, the converted image data and the MSB to the memory;

receiving, by a data input unit of the signal controller, all bits of the converted image data and the MSB from the memory;

restoring, by second logic circuits of the data input unit, all bits of the image data using the received converted image data and the received MSB, wherein each bit of the converted image data is a result of the first logic circuits performing an exclusive OR operation on the MSB of the image data and one of the remaining bits of the image data.

7. The method of claim 6, wherein the data output unit and the data input unit each comprise a plurality of exclusive OR gates.

8. The method of claim 7, wherein each of the plurality of exclusive OR gates of the data input unit has a corresponding one of the bits of the converted image data and the MSB and each of the plurality of exclusive OR gates of the data output unit has the MSB and one of the remaining bits of the image data as inputs.

9. The driving method of claim 6, wherein the converted image data and the MSB are received simultaneously from the memory.

10. The driving method of claim 6, wherein the converted image data and the MSB are received from a same discrete memory.

11. A liquid crystal display comprising:

a plurality of pixels, data lines transmitting data voltages to the pixels, a data driver applying the data voltages to the data lines, a signal controller that controls the data driver and processes image data input from an external circuit, and a memory that is connected to the signal controller, wherein the signal controller includes a data converter that converts the image data and outputs converted image data corresponding to the image data to the memory, and wherein the data converter includes a data output unit and a data input unit, wherein the data output unit sends a most significant bit MSB of the image data to the memory, converts the remaining bits of the image data into operated-on bits, and sends the operated-on bits to the memory, wherein the data input unit receives the MSB and the operated-on bits from the memory and restores the image data from the MSB and the operated-on bits, wherein the data output unit comprises a plurality of first logic circuits, and each of the first logic circuits has the MSB and one of the remaining bits of the image data as inputs, wherein the data input unit comprises a plurality of second logic circuits, and each of the second logic circuits has the MSB and one of the operated-on bits as inputs from the memory, and wherein the MSB of the image data and the operated-on bits are both input to the memory and output from the memory.

12. The liquid crystal display of claim 11, wherein the MSB does not pass through the plurality of first and second logic circuits.

13. The liquid crystal display of claim 12, wherein the plurality of first and second logic circuits comprise exclusive OR gates.

14. The liquid crystal display of claim 11, wherein the operated-on bits and the MSB are received simultaneously from the memory.

15. The liquid crystal display of claim 11, wherein the operated-on bits and the MSB are received from a same discrete memory as the remaining bits.

* * * * *